United States Patent
Tokunaga

(10) Patent No.: US 6,867,891 B2
(45) Date of Patent: Mar. 15, 2005

(54) OPTICAL SCANNING DEVICE AND IMAGE FORMING APPARATUS INCLUDING THE SAME

(75) Inventor: Atsuo Tokunaga, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/235,753

(22) Filed: Sep. 6, 2002

(65) Prior Publication Data

US 2003/0048516 A1 Mar. 13, 2003

(30) Foreign Application Priority Data

| Sep. 7, 2001 | (JP) | 2001-271842 |
| Sep. 7, 2001 | (JP) | 2001-271843 |
| May 7, 2002 | (JP) | 2002-131998 |

(51) Int. Cl.[7] .................................................. G02B 26/08
(52) U.S. Cl. ....................................................... 359/205
(58) Field of Search ................................ 359/204, 205, 359/216; 347/256, 259, 261

(56) References Cited

U.S. PATENT DOCUMENTS

| 5,007,692 A | | 4/1991 | Matsuura |
| 5,309,270 A | * | 5/1994 | Yamakawa ................... 359/196 |
| 5,668,590 A | * | 9/1997 | Maruo et al. ................. 347/256 |
| 5,673,187 A | | 9/1997 | Tokunaga et al. |
| 5,881,339 A | | 3/1999 | Yanagida et al. |
| 5,970,282 A | | 10/1999 | Yanagida et al. |
| 6,049,408 A | | 4/2000 | Tada |
| 6,061,162 A | * | 5/2000 | Shiraishi et al. ............. 359/204 |
| 6,072,703 A | | 6/2000 | Tokunaga |
| 6,288,818 B1 | | 9/2001 | Yoshimaru |
| 6,636,340 B1 | * | 10/2003 | Hama et al. ................. 359/204 |

FOREIGN PATENT DOCUMENTS

| JP | 7-92408 | 4/1995 |
| JP | 7-244247 | 9/1995 |
| JP | 10-307269 | 11/1998 |
| JP | 10-307271 | 11/1998 |
| JP | 11-125778 | 5/1999 |
| JP | 2000-187171 | 7/2000 |

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

An optical scanning device of the present invention includes a light source for emitting a light beam, a rotatable deflector having a plurality of deflecting faces, a first group of optical devices for shaping the light beam issuing from the light source and directing the shaped light beam toward the deflector, and a second group of optical devices for focusing the light beam deflected by the deflector on a surface to be scanned. The second group of optical devices split the light beam into at least two regions and cause each split light beam to scan a particular position on the above surface within a preselected range in the main scanning direction. The optical scanning device is small size and low cost.

12 Claims, 17 Drawing Sheets

OPTICAL SCANNING DEVICE AND IMAGE FORMING APPARATUS INCLUDING THE SAME

BACKGROUND OF THE INVENTION

1. Field of the Invention

The present invention relates to an optical scanning device and a copier, printer, facsimile apparatus or similar electrophotographic image forming apparatus.

2. Description of the Background Art

Today, a color image forming apparatus is replacing a monochromatic image forming apparatus in parallel with the spread of personal computers. In this respect, there is an increasing demand for a small-size high-velocity image forming apparatus. A color copier, which is a specific form of an electrophotographic image forming apparatus, is capable of producing a full-color image by using, e.g., yellow, magenta, cyan and black toner. For this purpose, the color copier forms images of different colors either serially or in parallel with respect to time. As for the number of copies of size A4 to be output for a minute, parallel processing produces a greater number of copies than serial processing, as well known in the art.

Small-size, low-cost writing optics is essential with an image forming apparatus of the type executing parallel processing stated above. More specifically, this type of image forming apparatus needs optical writing units equal in number to images of different colors to be dealt with together. Even when a particular optical writing unit is assigned to each image forming section, an LDA (Laser Diode Array) is generally used for size reduction. However, considering performance (pixel density and tonality) required of light-emitting devices, it is impractical to reduce cost more than a certain limit. In this sense, the cost of the individual light-emitting device itself must be reduced. Also, installation cost for implementing the accuracy of joints between nearby light-emitting devices must be reduced. Further, the positional relation between the light-emitting devices and a surface to be scanned must be maintained with accuracy.

Various light-emitting devices are available for optical writing devices used in various fields (LD (Laser Diode), CD (Compact Disk), CD-R (CD ROM), CD-RW (CD Read-Write) and DVD (Digital Versatile Disk)) and are decreasing in cost. Such light-emitting devices reduce the cost of the optical writing unit more than LDAs. However, a light source including a light-emitting device, a deflector for steering a light beam and optical lenses, among others, are the key to cost reduction. It is therefore necessary to reduce the cost of such key parts as well as a space to be occupied thereby.

In light of the above, Japanese Patent Laid-Open Publication Nos. 11-249042 and 2000-214401 each disclose an optical scanning device devised to integrate a deflector and a light source. However, a problem with Laid-Open Publication No. 11-249042 is that only one deflecting surface is available with a deflector. Another problem is that a plurality of light-emitting devices cannot be used in combination because light beams incident to the deflector other than the center of rotation vary in the direction of height. Such an optical scanning device is not feasible for high-velocity scanning. A problem with Laid-Open Publication No. 2000-214401 is that an optical switching device is necessary and increases cost.

There have also been proposed an arrangement in which the deflecting face of a deflector is increased in height, an arrangement in which a deflector has deflecting faces stacked one above the other, and an arrangement in which a plurality of deflecting faces are used. These arrangements, however, not only increase the cost of the deflector, but also obstruct the sharing of a light source and optical devices including fθ lenses.

SUMMARY OF THE INVENTION

It is an object of the present invention to provide an optical scanning device realizing small-size low-cost writing optics for executing parallel processing and an image forming apparatus including the same.

An optical scanning device of the present invention includes a light source for emitting a light beam, a rotatable deflector having a plurality of deflecting faces, a first group of optical devices for shaping the light beam issuing from the light source and directing the shaped light beam toward the deflector, and a second group of optical devices for focusing the light beam deflected by the deflector on a surface to be scanned. The second group of optical devices split the light beam into at least two regions and cause each split light beam to scan a particular position on the above surface within a preselected range in the main scanning direction.

An image forming apparatus including the above optical scanning device is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
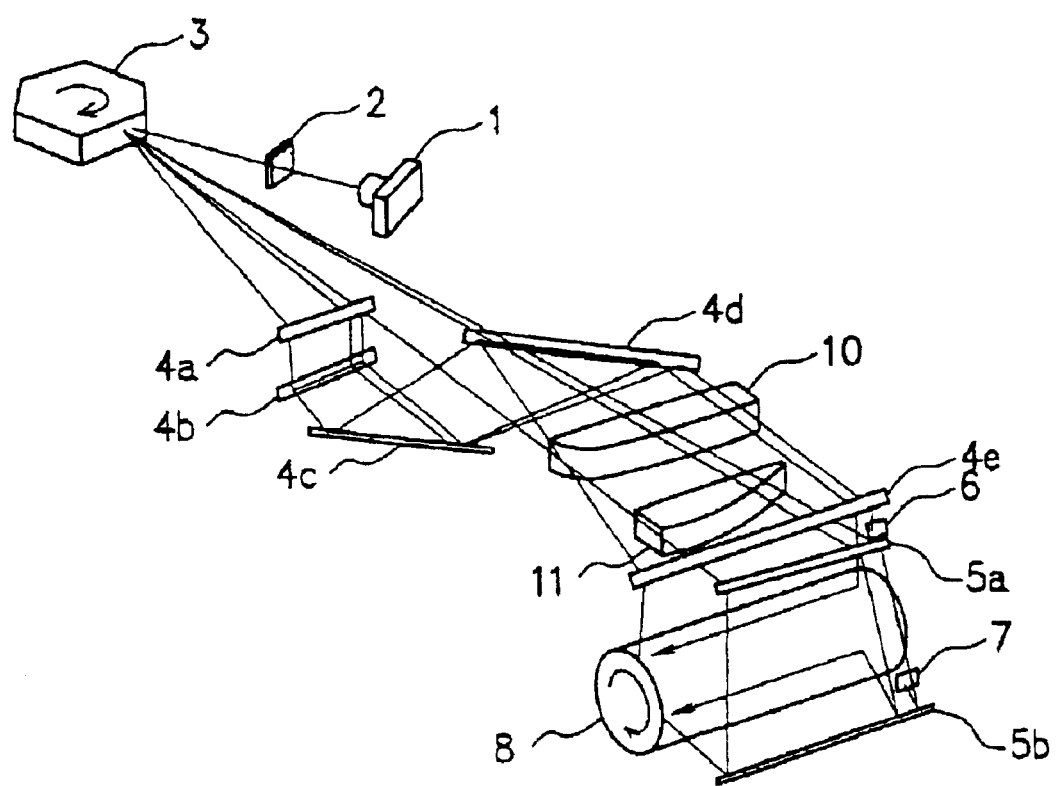
FIG. 1 is a perspective view showing a first embodiment of the optical scanning device and image forming apparatus in accordance with the present invention.

Preferred embodiments of the optical scanning device and image forming apparatus in accordance with the present invention will be described hereinafter with reference to the accompanying drawings. In the figures, identical reference numerals designate identical structural elements.

First Embodiment

FIG. 1 shows a first embodiment of the image forming apparatus in accordance with the present invention including an optical scanning device. As shown, an LD unit 1 includes an LD and emits a laser beam modulated in accordance with image data under the control of an LD drive controller not shown. The LD unit 1 additionally includes a collimator lens for outputting parallel rays.

The LD unit 1 may be configured to emit a plurality of laser beams with an array configuration or with a single LD and optical devices. Such an LD unit 1 allows the optical scanning unit to scan a plurality of scanning lines at the same time. In this case, light beams focused on the same zone of a desired surface at different positions each are made up of a plurality of light beams.

Although an LDA implements a simple, small-size light source, an integrated light source implemented as a combination including general-purpose LDs is lower in cost than an LDA. As for combination, it is a common practice to optically synthesize laser beams by use of, e.g., a prism or to incline the LDs relative to the others such that a required pitch is obtainable on a desired surface.

In a first region, the laser beam output from the collimator lens is input to a polygonal mirror or deflector 3 via a cylindrical lens 2. The laser beam deflected, or steered, by the polygonal mirror 3 is routed through mirrors 4*a* through 4*d* to an fθ lens 10. The fθ lens 10 transforms the incident laser beam having constant angular velocity to a light beam having constant velocity. The light beam with constant velocity is reflected by a mirror 4*e* toward a synchronization sensor 6 and a photoconductive drum 8, which is a specific form of a surface to be scanned. The synchronization sensor 6 is positioned outside of the image range of the drum 8 and plays the role of scanning timing sensing means.

In a second region, an fθ lens 11 transforms the laser beam having constant angular velocity to a light beam having constant velocity. The light beam deflected by the fθ lens 11 is routed through mirrors 5*a* and 5*b* to a synchronization sensor or scanning timing sensing means also located outside of the image range of the drum 8. At the same time, the laser beam is incident to another position of the drum 8.

As stated above, the light beam in the first region and the light beam in the second region scan the same portion of the same surface to be scanned in the main scanning direction, but at different positions in the subscanning direction. It is to be noted that the same surface to be scanned refers to the same region as to an image.

Figure 2:
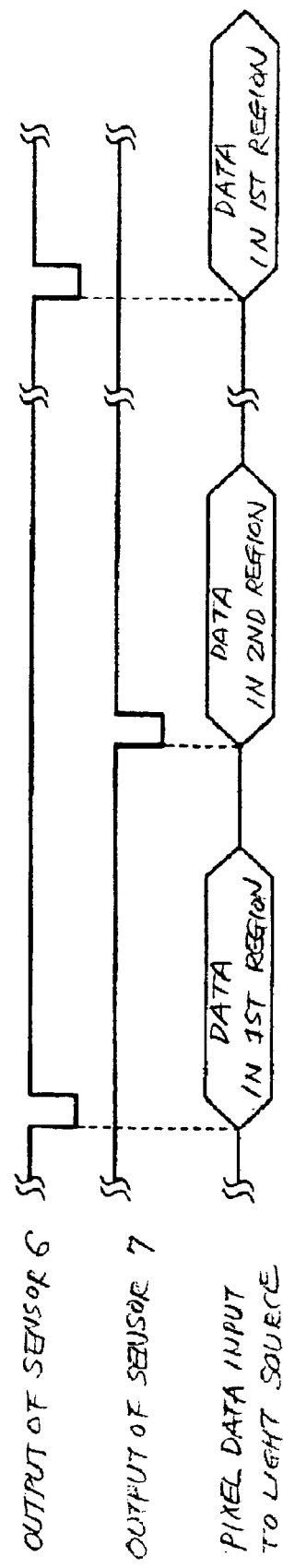
FIG. 2 is a timing chart demonstrating the operation of the first embodiment.

As shown in FIG. 2, the synchronization sensors 6 and 7 each sense a particular light beam deflected by the polygonal mirror 3. The outputs of the sensors 6 and 7 are used to maintain the scanning start position on the drum 8 constant at all times. The light beams scan the drum 8 in accordance with image data output from an image processing section not shown.

Second Embodiment

Figure 3:
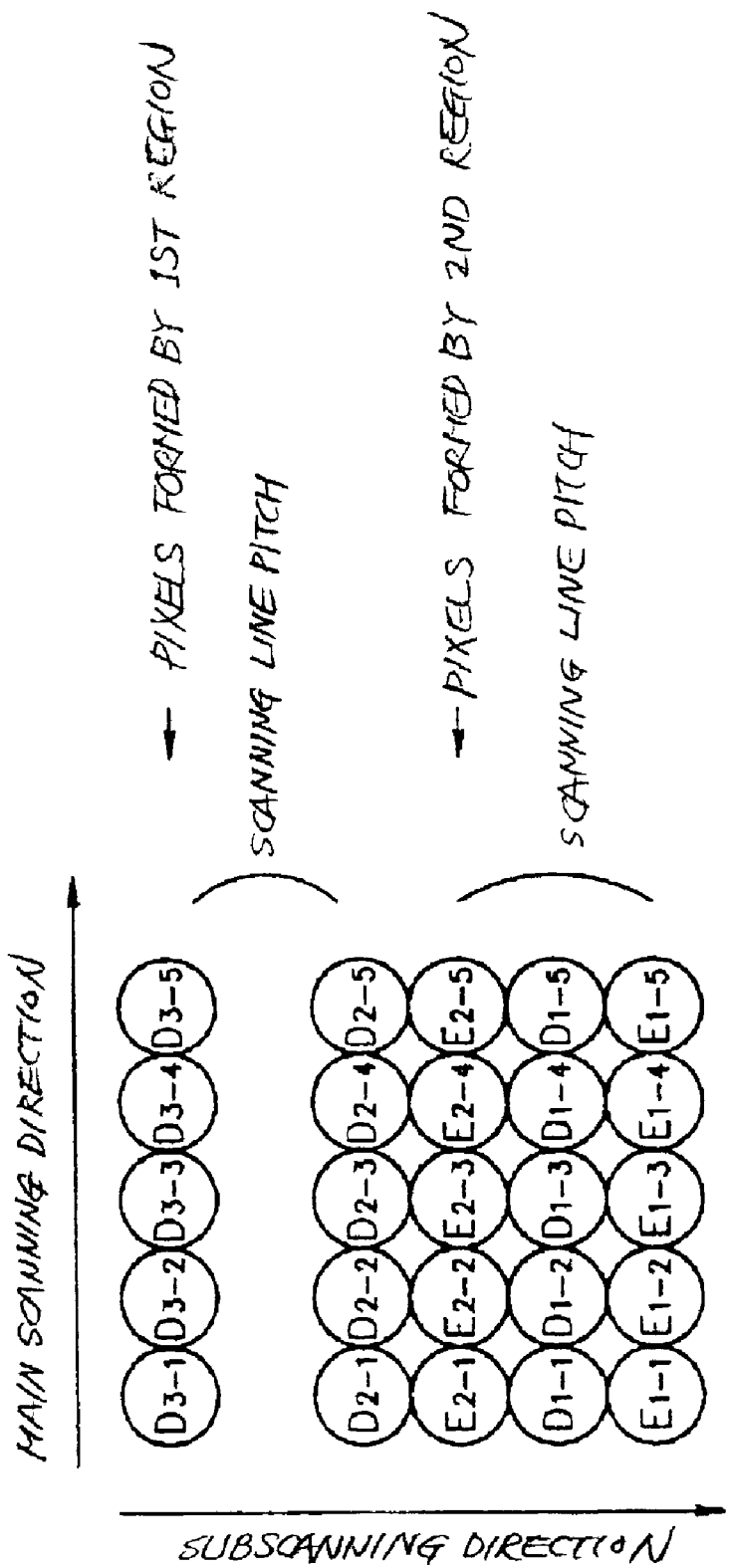
FIG. 3 shows how a second embodiment of the present invention forms pixels on a surface to be scanned.

FIG. 3 shows how pixels are formed on a surface to be scanned in accordance with a second embodiment of the present invention. As shown, pixels Dn-n and En-n are formed by the first and second regions, respectively. In the illustrative embodiment, an image is formed by the second region between the scanning line pitches (scanning beam pitches) of an image formed by the first region. More specifically, a plurality of light beams focused on the surface to be scanned in the same portion, but at different positions, alternate with each other in the subscanning direction.

Third Embodiment

Figure 4:
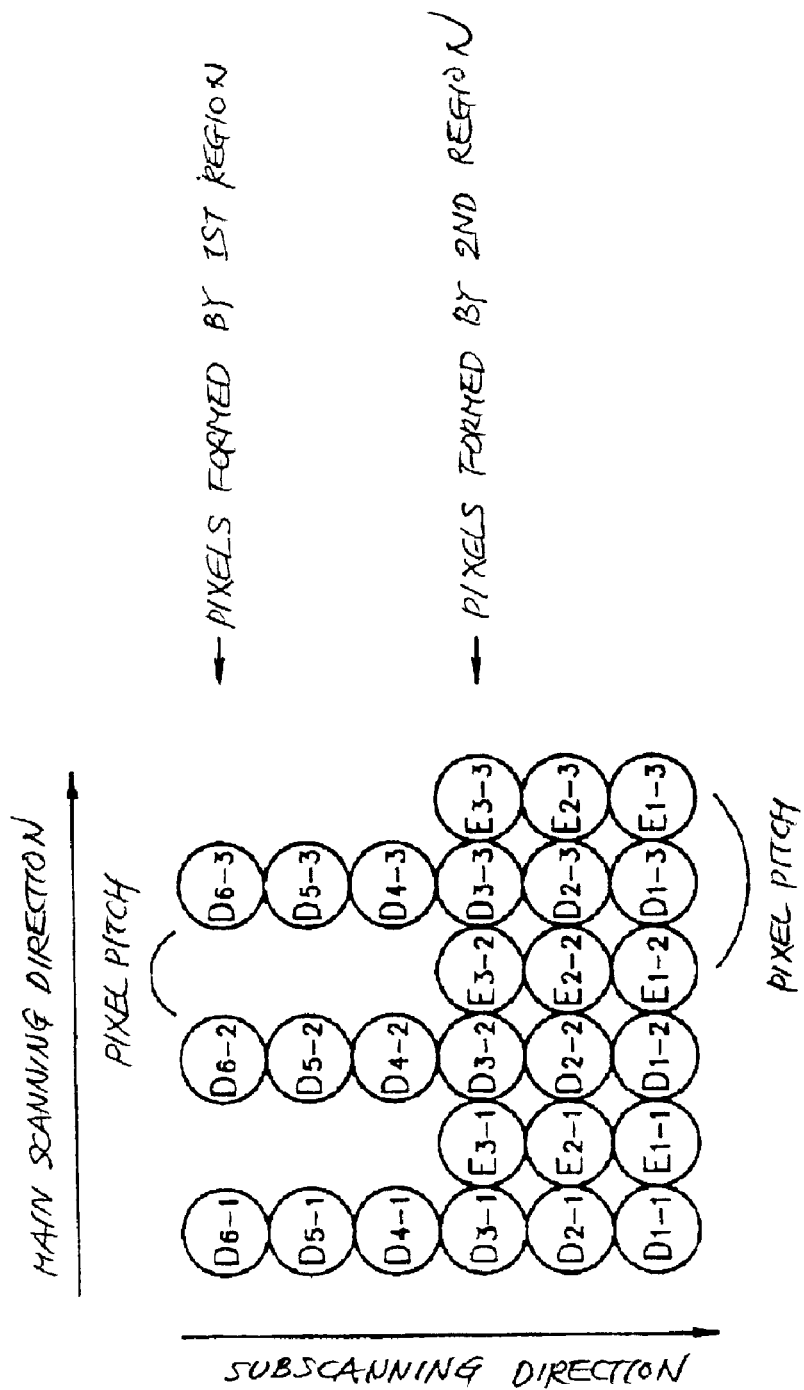
FIG. 4 shows how a third embodiment of the present invention forms pixels on a surface to be scanned.

FIG. 4 shows how pixels are formed on a surface to be scanned in accordance with a third embodiment of the present invention. As shown, pixels Dn-n and En-n are formed by the first and second regions, respectively. In the illustrative embodiment, an image is formed by the second region between the scanning line pitches (scanning beam pitches) of an image formed by the first region. More specifically, a plurality of light beams focused on the surface to be scanned in the same portion, but at different positions, alternate with each other in the main scanning direction.

Fourth Embodiment

Figure 5:
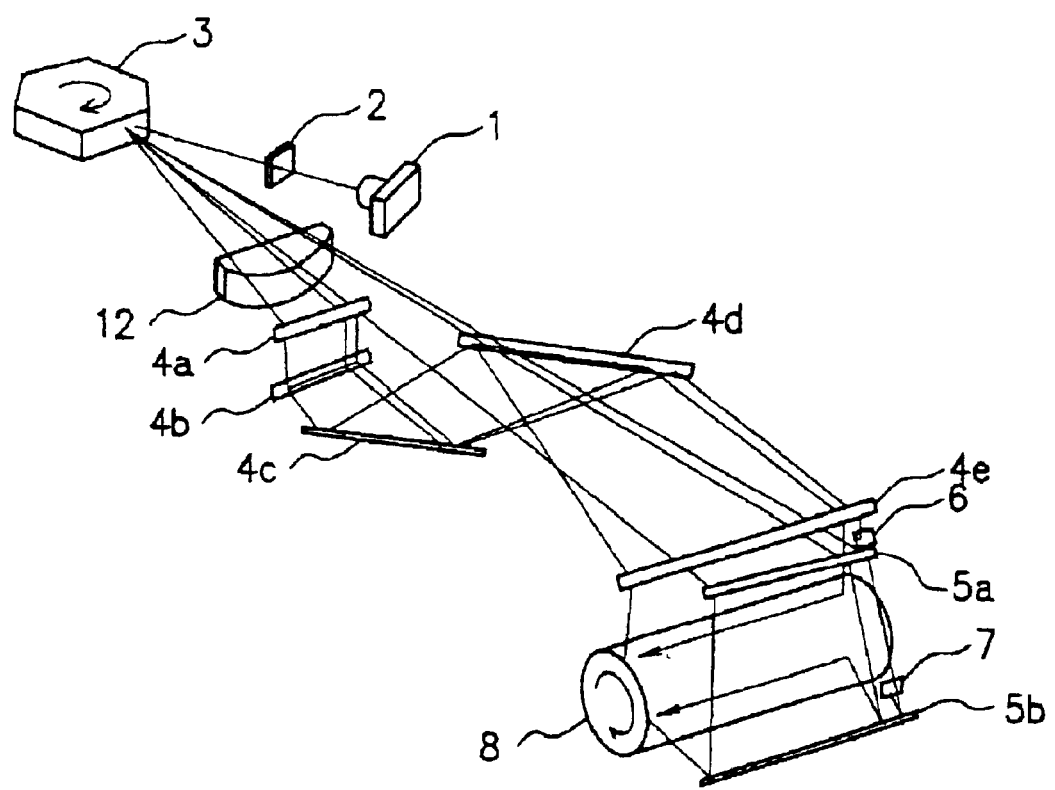
FIG. 5 is a perspective view showing a fourth embodiment of the present invention.

FIG. 5 shows a fourth embodiment of the present invention. As shown, this embodiment is identical with the first embodiment except that an fθ lens 12 extends over both of the first and second regions. The fθ lens 12 therefore effects fθ correction before the laser beam is split.

Fifth Embodiment

Figure 6:
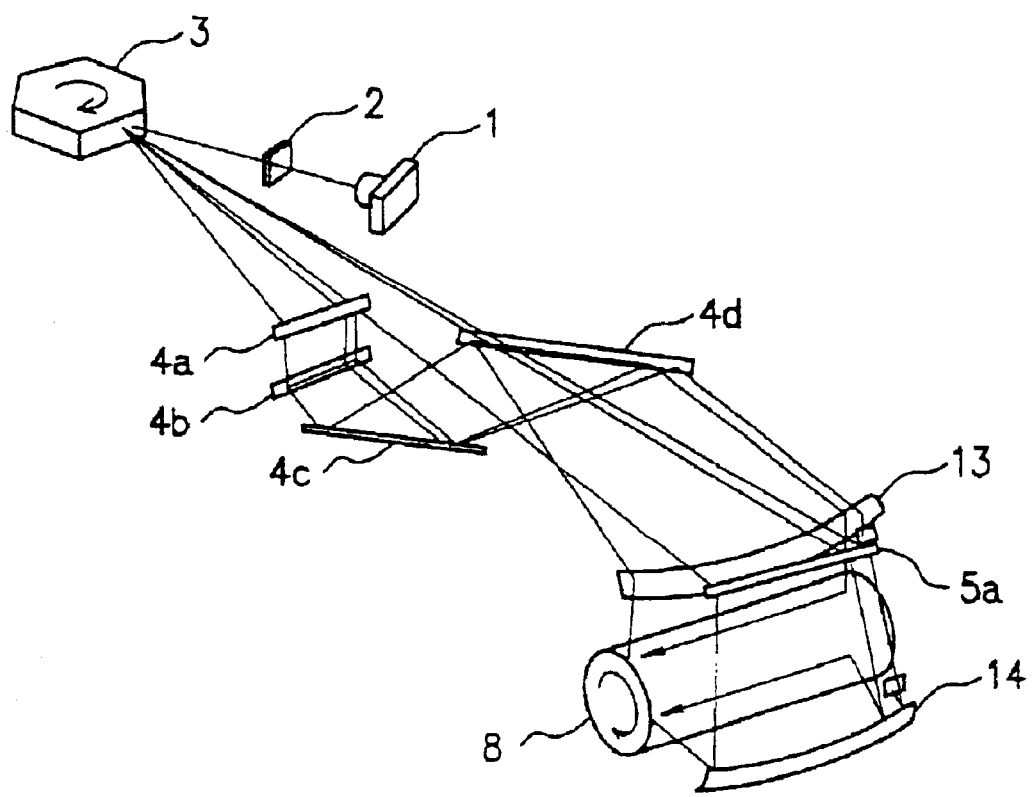
FIG. 6 is a perspective view showing a fifth embodiment of the present invention.

FIG. 6 shows a fifth embodiment of the present invention. As shown, this embodiment is identical with the first embodiment except that fθ mirrors 13 and 14 are assigned to the first and second regions, respectively. The lenses and mirrors are so configured and arranged as to set up the same optical path length in the first and second regions, thereby allowing the two regions to share the same optical devices.

Sixth Embodiment

Figure 7:
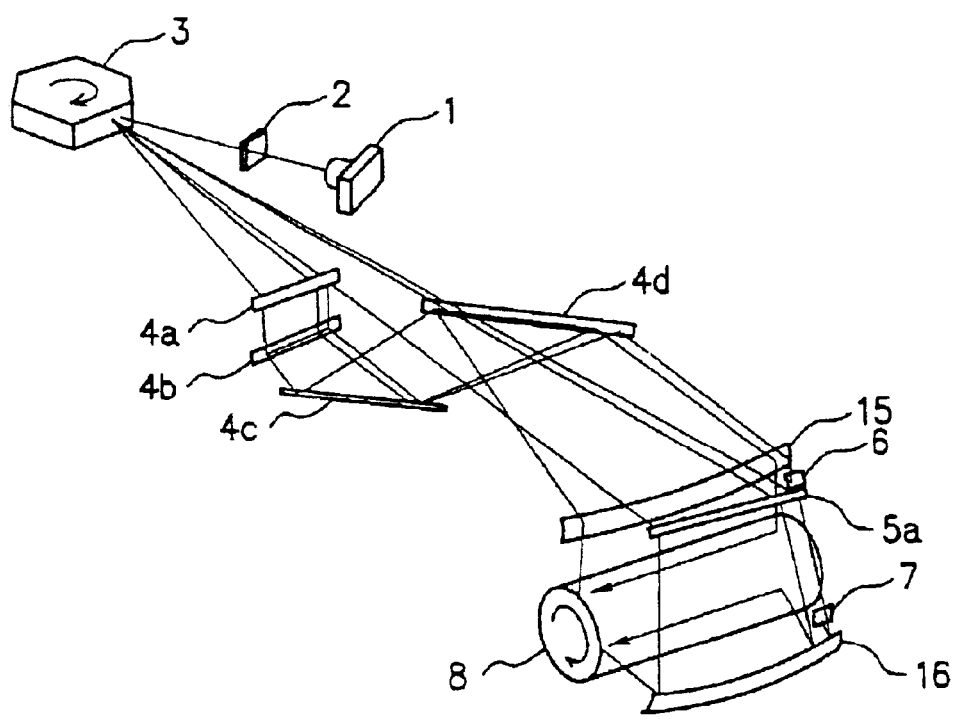
FIG. 7 is a perspective view showing a sixth embodiment of the present invention.

FIG. 7 shows a fifth embodiment of the present invention. As shown, this embodiment is identical with the first embodiment except that telecentric fθ mirrors 15 and 16 are assigned to the first and second regions, respectively. That is, the illustrative embodiment is characterized by using telecentric optics.

Figure 8A:
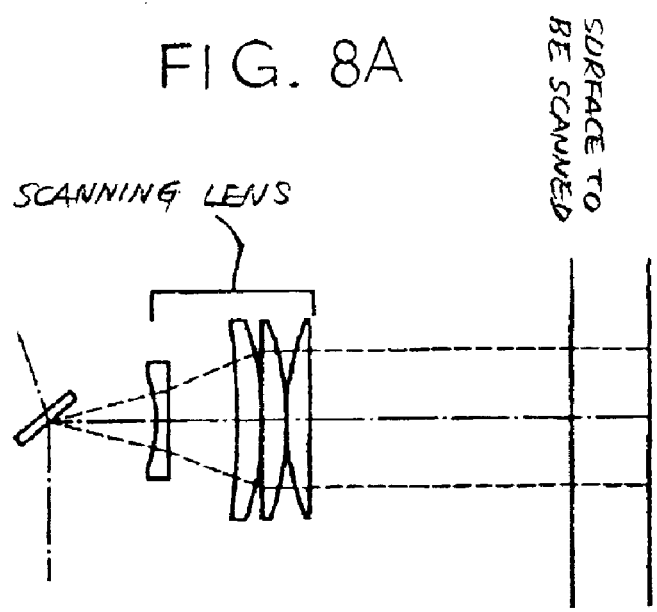
FIG. 8A shows a telecentric type optical scanning device.
Figure 8B:
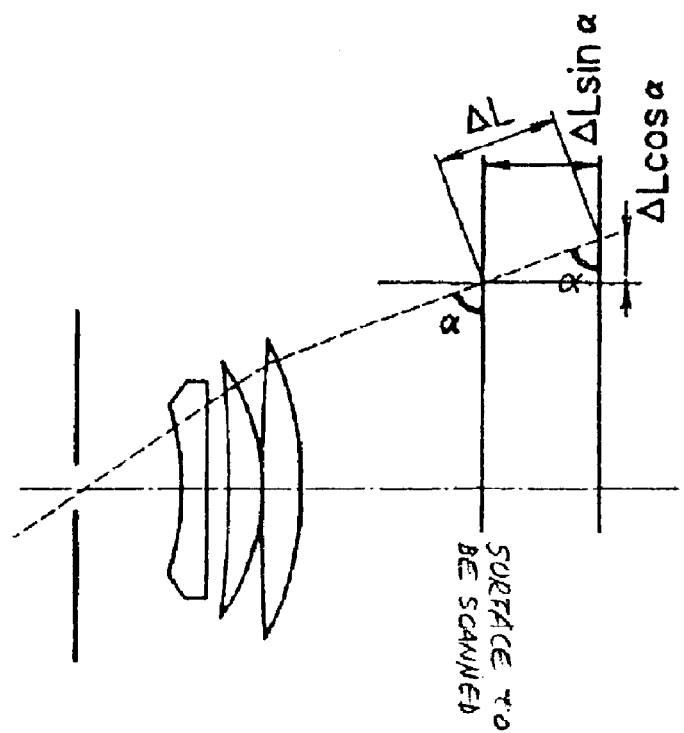
FIG. 8B shows a wide-angle type optical scanning device.

FIG. 8A shows specific telecentric optics while FIG. 8B shows specific wide-angle type optics. As shown in FIG. 8B, the wide-angle type optics has a problem that when the scanning angle of a light beam incident to a surface to be scanned is α, a change in optical path length ΔL causes the scanning position to be shifted outward by ΔLcosα. By contrast, as shown in FIG. 8A, when the scanning angle is β (≈90°), cos β is nearly equal to zero, i.e., the scanning position does not vary without regard to the optical path length.

As stated above, the illustrative embodiment is not susceptible to the optical path length even when the optical path length noticeably varies due to the bend or the eccentricity of the surface to be scanned. Another problem with the wide-angle type optics is that when an fθ lens is formed of, e.g., plastic, the scanning position on the surface to be scanned varies due to temperature and other environmental factors.

Seventh Embodiment

Figure 9:
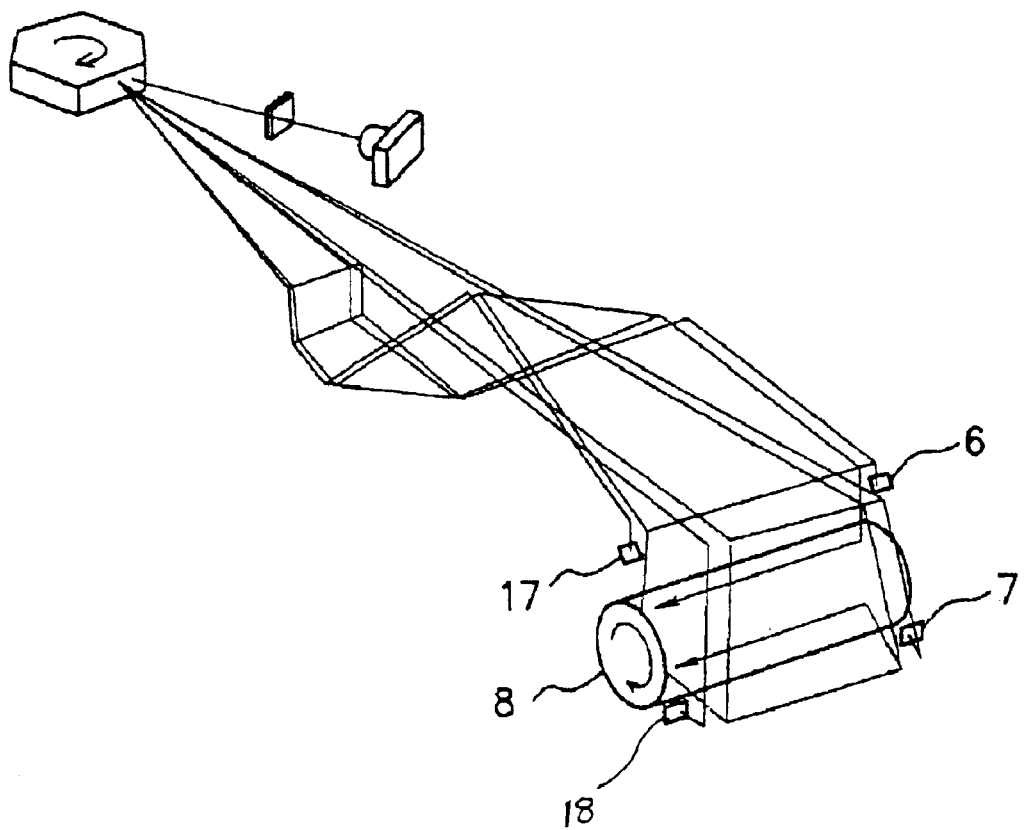
FIG. 9 is a perspective view showing a seventh embodiment of the present invention.

Reference will be made to FIG. 9 for describing a seventh embodiment of the present invention. As shown, the illustrative embodiment differs from the first embodiment in that synchronization sensors 6 and 7 and synchronization sensors 17 and 18 are positioned at opposite sides of the scanning range. The synchronization sensors 6 and 17 and synchronization sensors 7 and 18 are assigned to the first and second regions, respectively.

Figure 10:
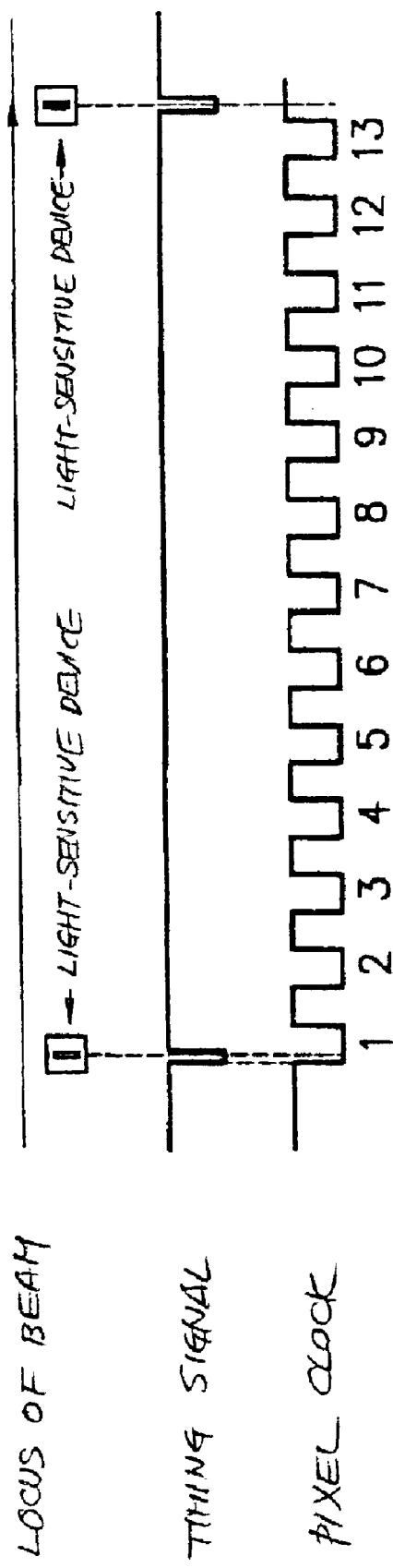
FIG. 10 is a timing chart demonstrating the operation of the seventh embodiment.

As shown in FIG. 10, in the illustrative embodiment, signals output from each of the synchronization sensors 6, 7, 17 and 18 are counted by use of a pixel clock. More specifically, each sensor outputs a timing signal when the light beam scans its light-sensitive device. Such timing signals and pixel clock are used to count the pulses of the pixel clock appearing between the scanning start point and the scanning end point.

Assume that the scanning position is varied, e.g., extended due to the influence of a lens or similar cause. Then, pixels are extended on the surface being scanned. Stated another way, the pixel clock is extended because the distance between the light-sensitive devices of the associated sensors is fixed. As a result, the number of pulses of the pixel clock counted between the timing signal output at the scanning start point and the timing signal output at the scanning end point is smaller than expected. Therefore, by counting the pulses of the pixel clock between the light-sensitive devices, it is possible to easily detect the variation of scanning position.

To count the pixel clock pulses with accuracy, use is made of means for synchronizing the pixel clock to the light-sensitive device positioned at the scanning start point.

Further, to correct the variation of the scanning position on the basis of the sensed scanning position, use is made of means for adjusting the frequency of the pixel clock. For adjustment, the pixel clock pulses are counted in a preselected environment beforehand so as to use the count as a default. When the number of pixel clock pulses counted during actual scanning is greater than the default, the frequency of the pixel clock is lowered. When the number of pixel clock pulses is smaller than the default, the frequency is raised. In this manner, the count of the pixel clock pulses is therefore controlled to the default.

While the laser beam has been shown and described as being split into two in the above embodiments, the light beam may be split into three or more by a similar arrangement. The crux is that the light beam be split into at least two.

Eighth Embodiment

Figure 11A:
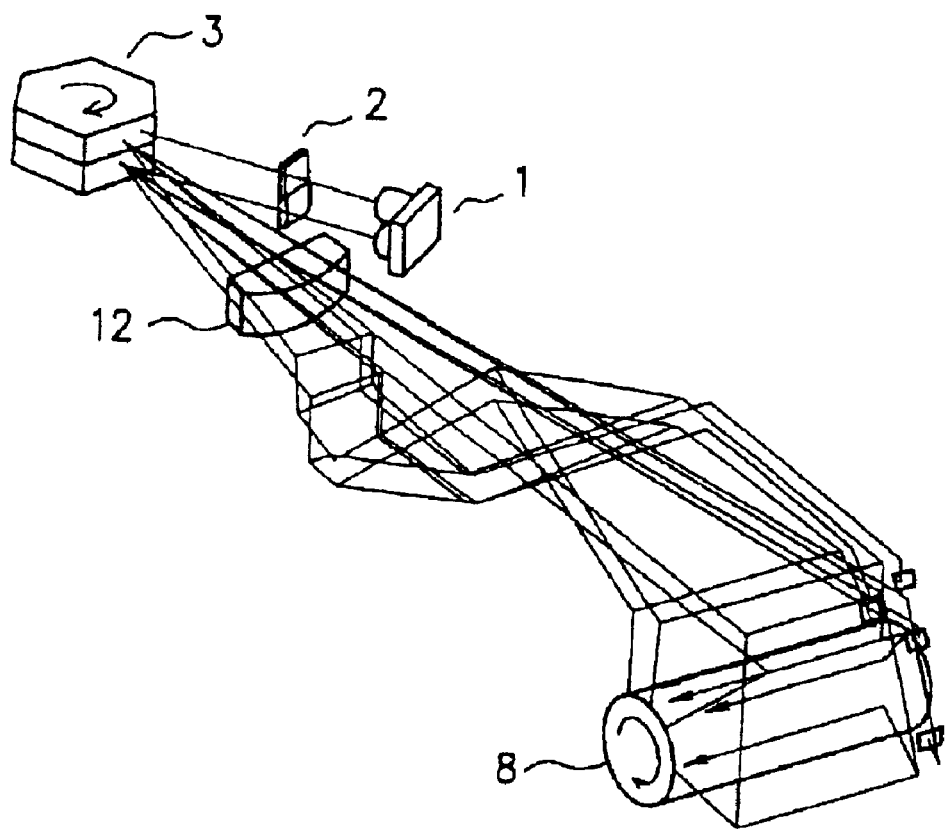
FIG. 11A is a perspective view showing an eighth embodiment of the present invention.

FIG. 11A shows an eighth embodiment of the present invention. As shown, in the illustrative embodiment, the LD unit 1 includes two light sources for forming four regions and each scanning a particular position of a single surface to be scanned. In the illustrative embodiment, the deflector 3 is implemented as a stack of two polygonal mirrors although it may be implemented as a single polygonal mirror. In any case, light beams issuing from the two light sources are split into four in total. As for the arrangement of optical devices and optical paths, the illustrative embodiment is basically similar to the sixth embodiment shown in FIG. 5.

Figure 11B:
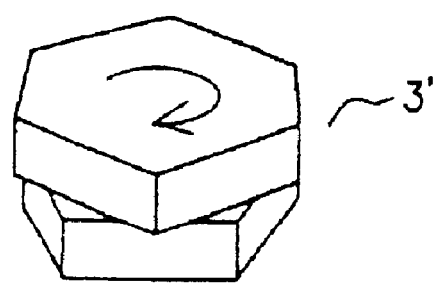
FIG. 11B is an isometric view showing a modified form of a polygonal mirror included in the eighth embodiment.
Figure 12:
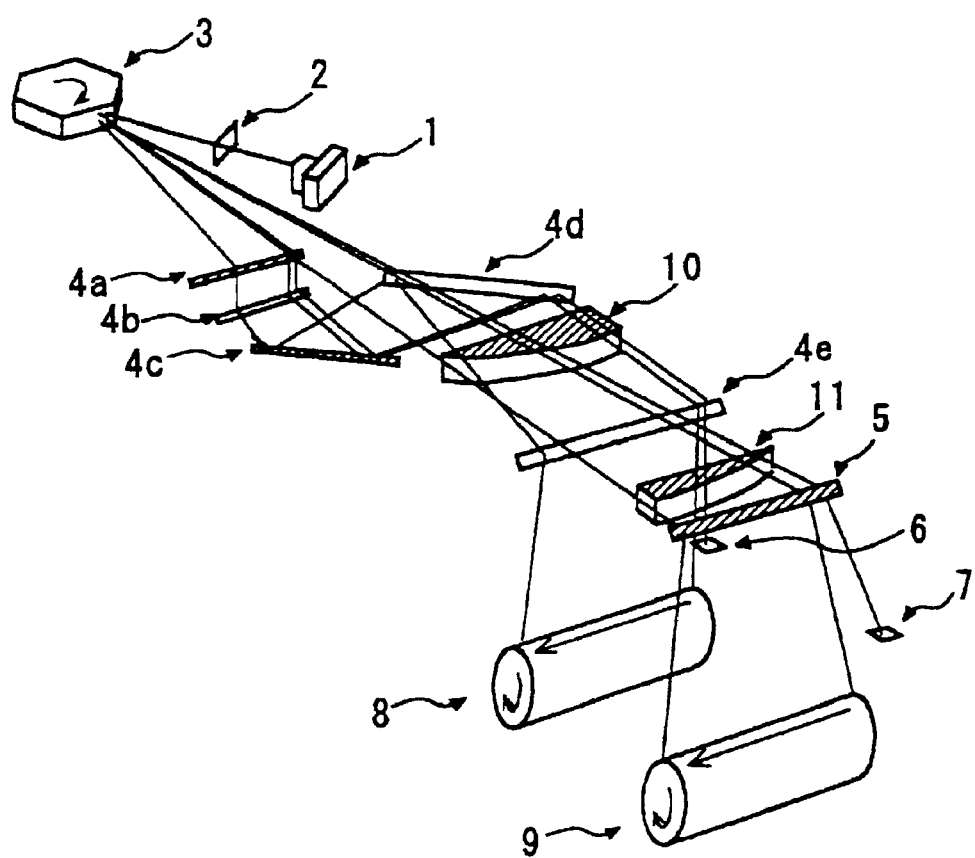
FIG. 12 is a perspective view showing a ninth embodiment of the present invention.

In FIG. 11A, the reflecting faces of one polygonal mirror are aligned with the reflecting faces of the other polygonal mirror. However, such a configuration is not essential because image data represented by a light beam reflected by at least one reflecting face are written to a memory. For example, as shown in FIG. 11B, the two polygonal mirrors of the deflector, labeled 13', may be angularly shifted from each other.

As stated above, the first to eighth embodiments achieve various unprecedented advantages, as enumerated below.

(1) The optical scanning device with the light source and deflector integrated together is desirable from the cost and space standpoint. This is particularly true in a high-speed system including a high-performance deflector (replacement of ball bearings with air bearings) and a multibeam light source (integrated type of LDA).

(2) The scanning device scans different regions when forming a single image. Therefore, shared optical devices implement an optical scanning device configured to form different images, an optical scanning device having a plurality of lines in the subscanning direction, and an optical scanning device forming alternating pixels in the main scanning direction. More specifically, there can be implemented an optical scanning device capable of doubling image density in the subscanning direction and an optical scanning device capable of doubling image density in the main scanning direction.

(3) The integration of fθ lenses further enhances cost and space reduction. This is also true when fθ lenses are replaced with fθ mirrors.

(4) When the scanning angle is β ($\approx 90°$), cos β is nearly equal to zero, i.e., the scanning position does not vary without regard to the optical path length.

(5) A plastic lens can be used because the scanning position is corrected on the basis of the variation of the scanning position sensed.

Ninth Embodiment

Referring to FIG. 9, a ninth embodiment of the present invention will be described. As shown, in the first region, the laser beam reflected by the deflector or polygonal mirror 3 and having constant angular velocity is transformed to a light beam having constant velocity by the fθ lens 11. The beam with constant velocity is reflected by the mirror 5 toward the synchronization sensor 7 and a drum 9, forming a latent image on the drum 9. In the second region, the laser beam reflected by the deflector 3 is routed through the mirrors 4a through 4d to the fθ lens 10 and also converted to a light beam having constant velocity. This light beam is reflected by the mirror 4e toward the synchronization sensor 6 and drum 8, forming a latent image on the drum 8.

Figure 13:
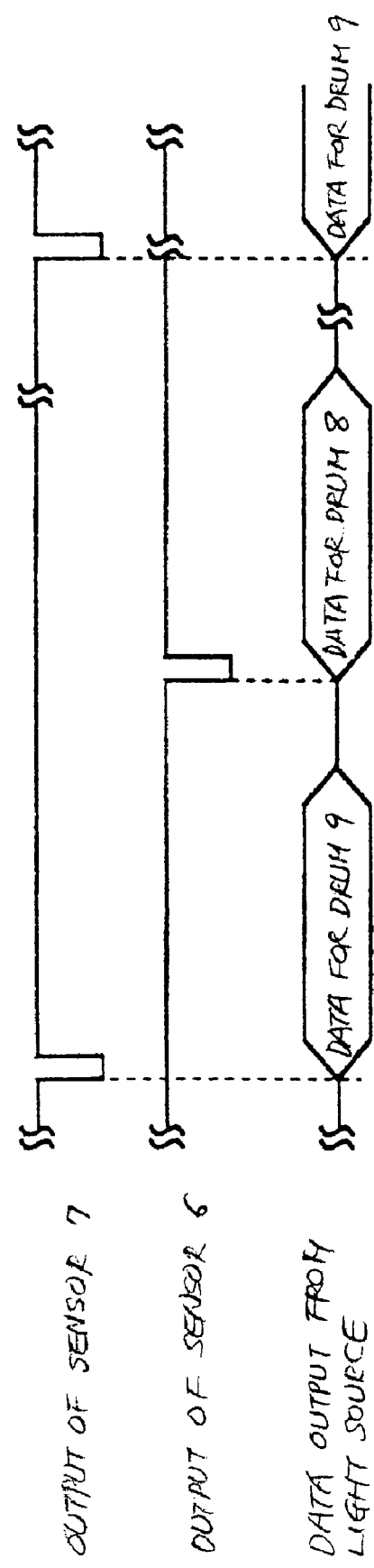
FIG. 13 is a timing chart demonstrating the operation of the ninth embodiment.

The scanning start position on each of the drums 8 and 9 is maintained constant at all times on the basis of the outputs of the synchronization sensors 6 and 7. The light beam scans the drums 8 and 9 in accordance with image data at preselected timing. FIG. 13 demonstrates how the laser beam is synchronized to the first and second regions.

The illustrative embodiment with the LD unit 1 and polygonal mirror 3 integrated together is desirable from the cost and space standpoint. Particularly, while ball bearings must be replaced with air bearings in order to enhance the performance of the polygonal mirror 3, the illustrative embodiment needs a minimum number of air bearings and therefore a minimum of cost. Further, a decrease in the number of air bearings is desirable in a system in which the LD unit 1 is provided with a multibeam configuration (integrated type of LDA), because the polygonal mirror 3 and LD unit 1 are costly.

The LD unit 1 is configured to emit a plurality of laser beams with an array configuration for thereby scanning a plurality of scanning lines at the same time. Alternatively, independent LDs and optical devices may be combined to emit a plurality of laser beams for the same purpose.

Although an LDA implements a simple, small-size light source, the integrated light source 1 implemented as a combination of independent, general-purpose LDs is lower in cost than an LDA. As for combination, it is a common practice to optically synthesize laser beams by use of, e.g., a prism or to incline each LD relative to the others such that a required pitch is obtainable on a desired surface.

Tenth Embodiment

Figure 14:
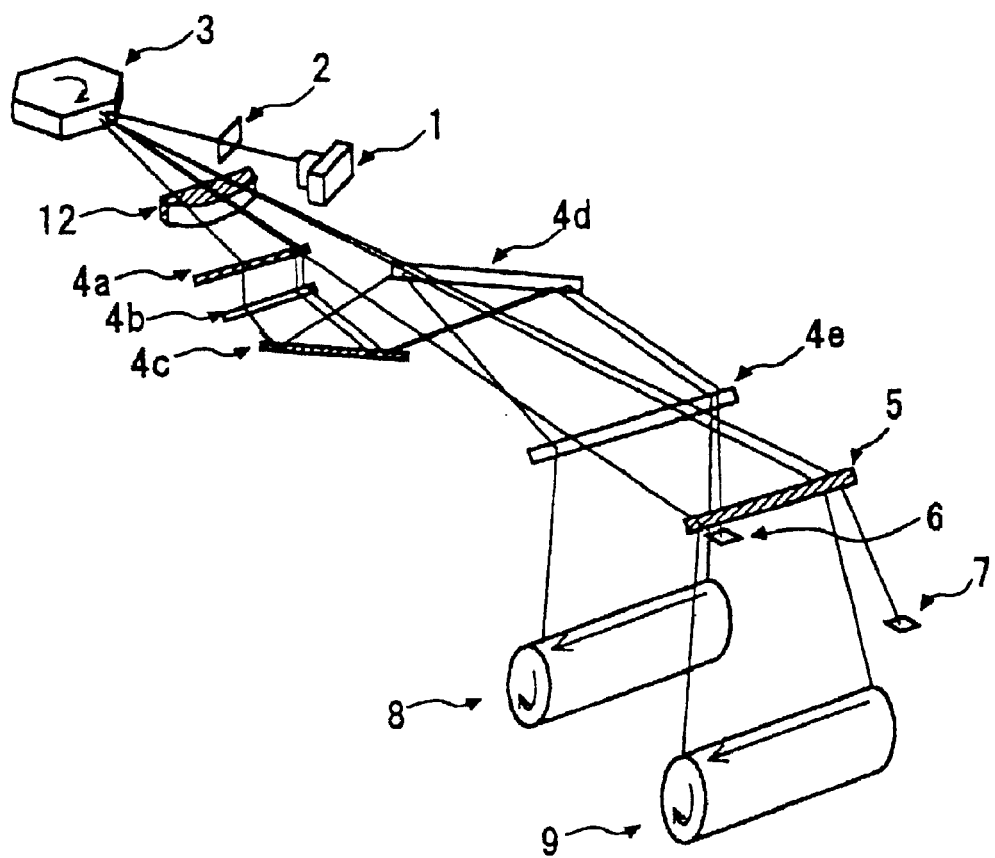
FIG. 14 is a perspective view showing a tenth embodiment of the present invention.

FIG. 14 shows a tenth embodiment of the present invention. As shown, this embodiment is identical with the ninth embodiment except that the fθ lens 12 extends over both of the first and second regions. The integration of the fθ lens 12 further saves cost and space and thereby reduces the overall size of the image forming apparatus.

Eleventh Embodiment

Figure 15:
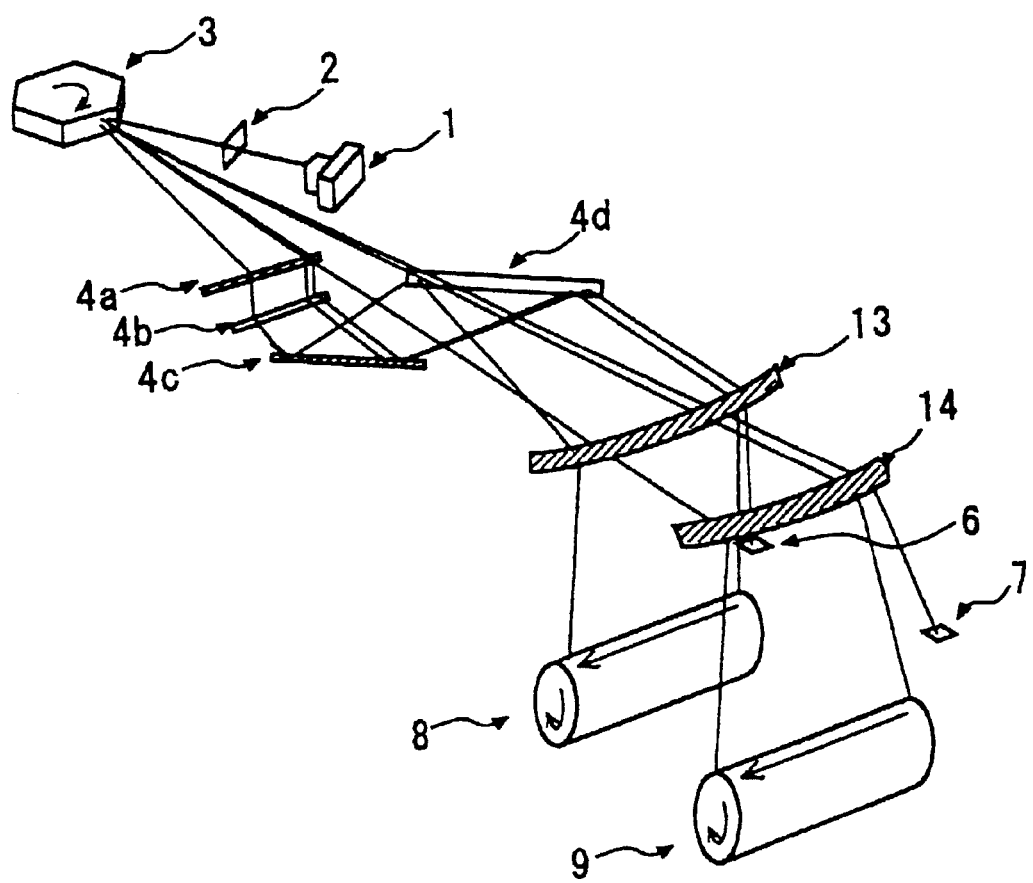
FIG. 15 is a perspective view showing an eleventh embodiment of the present invention.

FIG. 15 shows an eleventh embodiment of the present invention. As shown, that fθ mirrors 13 and 14 are assigned to the first and second regions, respectively. The fθ mirrors 13 and 14 substituted for the fθ lens 12 reduce cost and noticeably save space, thereby reducing the overall size of the image forming apparatus.

Again, the laser beam may be split into three or more by a similar arrangement. The crux is that the laser beam be split into at least two, as stated earlier.

Figure 16:
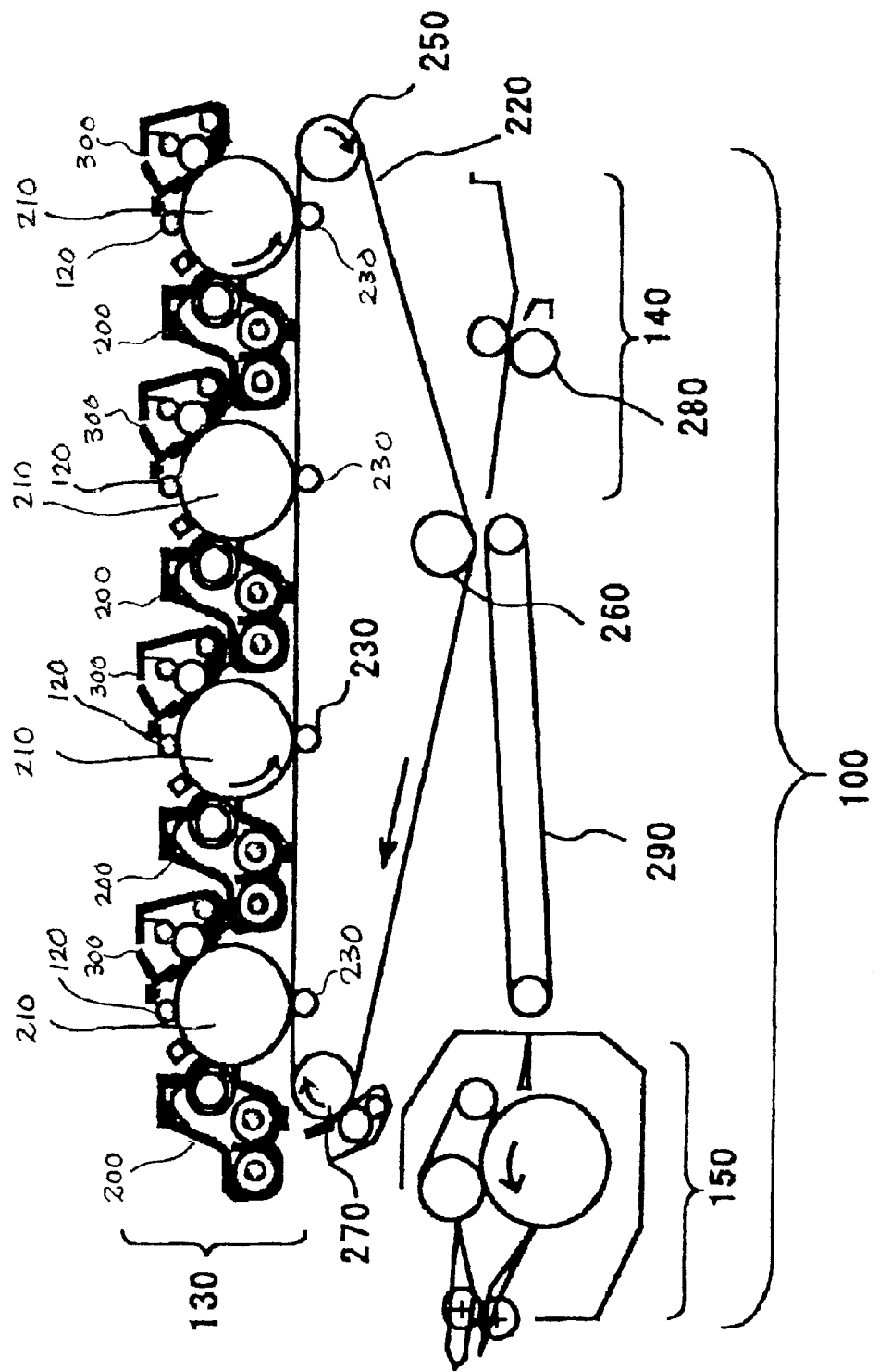
FIG. 16 is a view showing an image forming apparatus using any one of the illustrative embodiments.

Reference will be made to FIG. 16 for describing an image forming apparatus using any one of the ninth to eleventh embodiments and implemented as a tandem, color image forming apparatus. As shown, the color image forming apparatus includes a body 100 including an image forming section 130 and a sheet feeding section 140 as well as an optical writing section not shown. An image processing section, not shown, converts an image signal to black, yellow, magenta and cyan image data while sending such image data to the optical writing section. The optical writing section is implemented as an optical scanning device including an LD, a polygonal mirror or similar deflector, focusing optics, and mirrors. The optical writing section scans each of photoconductive drums 210 with a particular laser beam corresponding to particular color image data, thereby forming a latent image on the drum. At this instant, two optical scanning devices may respectively scan the first and second regions or a single optical scanning device may scan four regions alone.

More specifically, each drum 210 has a photoconductive layer usually implemented by OPC (Organic Photo Conductor). Arranged around the drum 210 are a charger 120, a developing unit 200 assigned to any one of black, yellow, magenta and cyan, a primary image transferring device 230, a cleaning unit 300, and a quenching lamp. It is to be noted that the developing unit 200 develops a latent image with a magnet brush consisting of toner grains and carrier grains.

An intermediate image transfer belt (simply belt hereinafter) 220 is passed over rollers 250, 260 and 270 and interposed between the drums 210 and the primary image transferring devices 230. While the belt 220 is in rotation, toner images of different colors are sequentially transferred from the drums 210 to the belt 220 one above the other, completing a full-color image. A sheet or recording medium is fed from the sheet feeding section 140 to the image forming section 130 via a registration roller pair 280. At a position where the belt 220 contacts a belt conveyor or secondary image transfer belt 290, the full-color image is transferred from the belt 220 to the sheet. The belt conveyor 290 conveys the sheet to a fixing unit 150. The fixing unit 150 fixes the full-color image on the sheet.

As stated above, the ninth to eleventh embodiment each split a light beam issuing from a light source into a plurality of regions. The integration of the light source and a deflector reduces cost and noticeably saves space. This is particularly true in a tandem, color image forming apparatus.

Twelfth Embodiment

Figure 17:
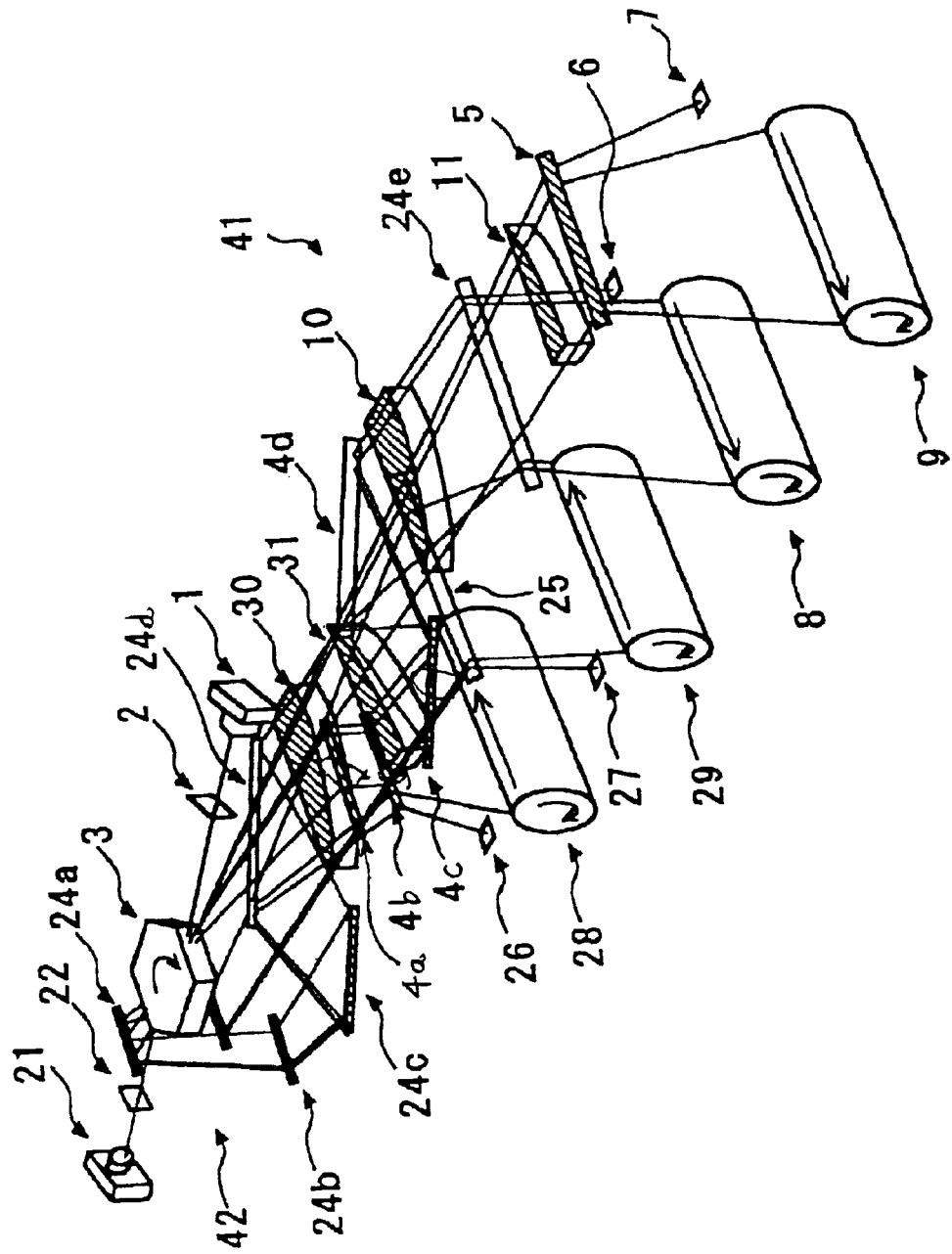
FIG. 17 is a perspective view showing a twelfth embodiment of the present invention.

Referring to FIG. 17, a twelfth embodiment of the present invention will be described. As shown, the illustrative embodiment implements a first and a second scanning system by use of the faces of the polygonal mirror 3 that face each other in the radial direction of the mirror 3. This is contrastive to the first embodiment using the adjoining faces of the polygonal mirror 3. Alternatively, the two scanning systems may be positioned on the same face of the polygonal mirror 3 vertically spaced from each other. Further, two polygonal mirrors may be stacked to implement the two scanning systems.

More specifically, in a first scanning system 41, the LD unit 1 emits a laser beam modulated in accordance with image data. The laser beam is incident to the polygonal mirror 3 via the cylindrical lens 2. In the first region, the laser beam steered by the polygonal mirror 3 is converted to a scanning beam having constant velocity instead of constant angular velocity by the fθ lens 11. The laser beam output from the fθ lens 11 is routed through the mirror 5 to the synchronization sensor 7 and drum 9, forming a latent image on the drum 9.

In the second region, the laser beam from the polygonal mirror 3 is routed through the mirrors 4a through 4d to the fθ lens 10 and converted to a light beam having constant velocity instead of constant angular velocity by the fθ lens 10. The light beam output from the fθ lens 10 is reflected by a mirror 24e to the synchronization sensor 6 and drum 8, forming a latent image on the drum 8.

The scanning start position on each of the drums 8 and 9 is maintained constant at all times on the basis of the outputs of the synchronization sensors 6 and 7. The laser beam scans the drums 8 and 9 in accordance with image data at preselected timing. The timing chart of FIG. 13 is also applicable to the illustrative embodiment.

A second scanning system 42 is similar to the first scanning system 41 except for the following. An LD unit 21 emits a laser beam modulated in accordance with image data. The laser beam is routed through a collimator lens 22 to the polygonal mirror 3. In the first region, the laser beam steered by the polygonal mirror 3 is converted to a light beam having constant velocity instead of constant angular velocity by an fθ lens 31 and then incident to a mirror 25. The mirror 25 reflects the light beam toward a synchronization sensor 27 and a photoconductive drum 29, so that the light beams forms a latent image on the drum 29.

In the second region, the laser beam from the polygonal mirror 3 is routed through mirrors 24a through 24d to an fθ lens 30 and converted to a light beam having constant velocity instead of constant angular velocity by the lens 30. The light beam output from the fθ lens 30 is incident to a synchronization sensor 26 and a photoconductive drum 28 via a mirror 24e, forming a latent image on the drum 28.

The scanning start position on each of the drums 28 and 29 is maintained constant at all times on the basis of the outputs of the synchronization sensors 26 and 27. The laser beam scans the drums 28 and 29 in accordance with image data at preselected timing.

With the above configuration, the illustrative embodiment saves space otherwise required for guaranteeing an optical length that splits a laser beam into four with a single scanning system. The illustrative embodiment also achieves the advantages described in relation to the ninth to eleventh embodiments and is applicable to the color image forming apparatus shown in FIG. 16.

In summary, the present invention provides an optical scanning device that splits a light beam issuing from a light source into a plurality of regions so as to integrate the light source and a deflector, thereby reducing cost and noticeably saving space. This is particularly true in a tandem, color image forming apparatus.

Various modifications will become possible for those skilled in the art after receiving the teachings of the present disclosure without departing from the scope thereof.

What is claimed is:

1. An optical scanning device comprising:
   a light source for emitting a light beam;
   a rotatable deflector having a plurality of deflecting faces and configured to move said light beam along a scan path in a main scanning direction;
   a first group of optical devices for shaping the light beam issuing from said light source and directing a shaped light beam toward said deflector; and
   a second group of optical devices for focusing the light beam deflected by said deflector on a surface to be scanned;
   wherein said second group of optical devices split the light beam into at least two regions each corresponding to a different portion of the scan path and first and second sensors sense deflection of the light beam to maintain the scan starting position in a main scanning position constant.

2. The device as claimed in claim 1, wherein split beams output from said second group of optical devices comprise a plurality of beams each.

3. The device as claimed in claim 2, wherein light emitting devices are combined to implement a plurality of light beams.

4. The device as claimed in claim 3, wherein fθ correction is effected before the light beam is split.

5. The device as claimed in claim 4, further comprising an fθ mirror.

6. The device as claimed in claim 1 wherein fθ correction is effected before the light beam is split.

7. The device as claimed in claim 6, further comprising an fθ mirror.

8. A tandem image forming apparatus comprising: an optical scanning device; and
   a plurality of image forming units each comprising an image carrier for forming a latent image thereon, a developing device for developing said latent image to thereby produce a corresponding toner image, and an image transferring device for transferring said toner image from said image carrier to a recording medium;
   said optical scanning device comprising: a light source for emitting a light beam;
   a rotatable deflector having a plurality of deflecting faces and configured to move said light beam along a scan path in a main scanning direction;
   a first group of optical devices for shaping the light beam issuing from said light source and directing a shaped light beam toward said deflector; and
   a second group of optical devices for focusing the light beam deflected by said deflector on a surface of said image carrier;
   wherein said second group of optical devices split the light beam into at least two regions each corresponding to a different portion of the scan path and first and second sensors sense deflection of the light beam to maintain the scan starting position in a main scanning position constant.

9. The device as claimed in claim 8, wherein split beams output from said second group of optical devices comprise a plurality of beams each.

10. The device as claimed in claim 9, wherein light emitting devices are combined to implement a plurality of light beams.

11. The device as claimed in claim 8, wherein fθ correction is effected before the light beam is split.

12. The device as claimed in claim 11, further comprising an fθ mirror.

* * * * *